Dec. 7, 1965   J. C. ARNTZEN   3,221,772
ARTICULATED CONDUIT BOOM ASSEMBLY
Filed March 11, 1963   2 Sheets-Sheet 1

INVENTOR.
John C. Arntzen
BY
Hill, Sherman, Meroni, Gross & Simpson
ATTORNEYS

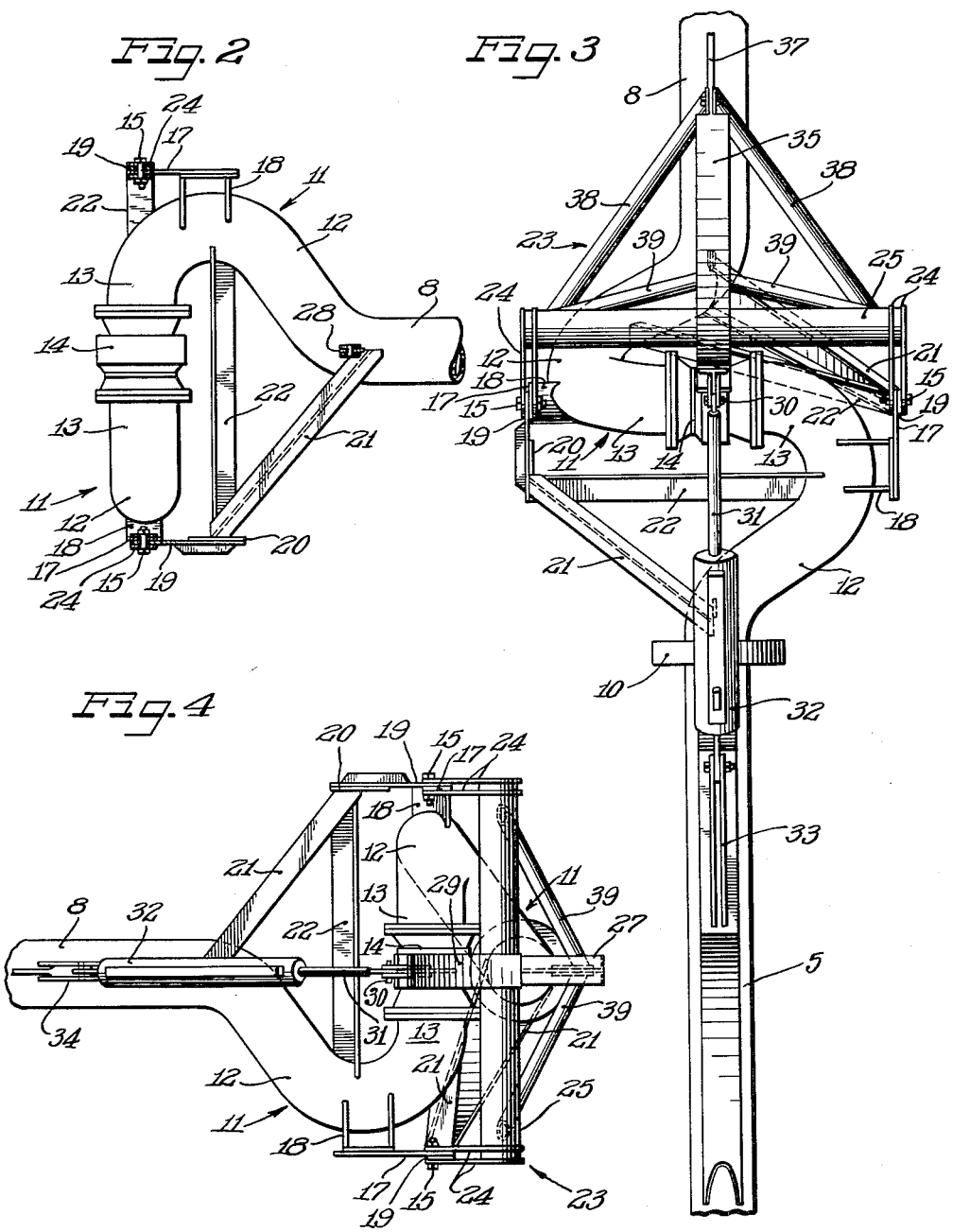

United States Patent Office 3,221,772
Patented Dec. 7, 1965

3,221,772
ARTICULATED CONDUIT BOOM ASSEMBLY
John C. Arntzen, Milton Township, Du Page County, Ill., assignor to Mississippi Valley Structural Steel Company, Chicago, Ill., a corporation of Illinois
Filed Mar. 11, 1963, Ser. No. 264,424
4 Claims. (Cl. 137—615)

The present invention relates to improvements in articulated conduit boom assemblies and is more particularly concerned with a new and improved yoke structure to afford equalized bearing loading at the swivel joints connecting the articulated sections of the boom assemblies.

In transferring fluent materials between loading docks and piers and cargo vehicles, such as trucks, railway cars and marine vessels including tankers and barges, a desirable conduit boom assembly for the purpose employs a plurality of conduit sections of relatively rigid pipe of suitable diameter coupled in relatively pivotal, swivelly adjustable relation. Due to various factors, among which is the bulk or size and weight of the equipment itself, but also including weather problems involving expansion and contraction, wind resistance, and the like, manipulation stresses, relative mobility of the dock and vehicle such as the rise, fall, drift, pitch and roll of vessels relative to fixed dock and pier structures, etc., heavy loads are imposed on the swivel joints. At the same time, it is highly desirable to make use of as nearly as practicable standard types of conduit and swivel couplings.

Accordingly, an important object of the present invention is to provide an efficient, reliable, strong, thoroughly reinforced and load equalized swivel joint structure for articulated conduit booms and the like.

Another object of the invention is to provide new and improved means for equalizing the bearing loads on the bearings of swivelly connected generally gooseneck heads of conduit boom sections.

A further object of the invention is to provide in a pivotally articulated bulk fluent material transfer boom assembly a new and improved swivel joint construction which efficiently cooperates with powered actuating means for relatively swivelly moving the pivotally connected sections of the assembly.

Yet another object of the invention is to provide a new and improved yoke structure for the swivel joints of bulk fluent material transfer conduit boom assemblies.

Other objects, features and advantages of the present invention will be readily apparent from the following detailed description of a preferred embodiment thereof taken in conjunction with the accompanying drawings, in which:

FIGURE 2 is an enlarged fragmentary sectional plan view taken substantially on the line II—II of FIGURE 1;

FIGURE 3 is a fragmentary elevational view taken substantially in the plane of line III—III of FIGURE 1; and FIGURE 4 is a fragmentary plan view taken substantially in the plane of line IV—IV of FIGURE 1.

Figure 1:
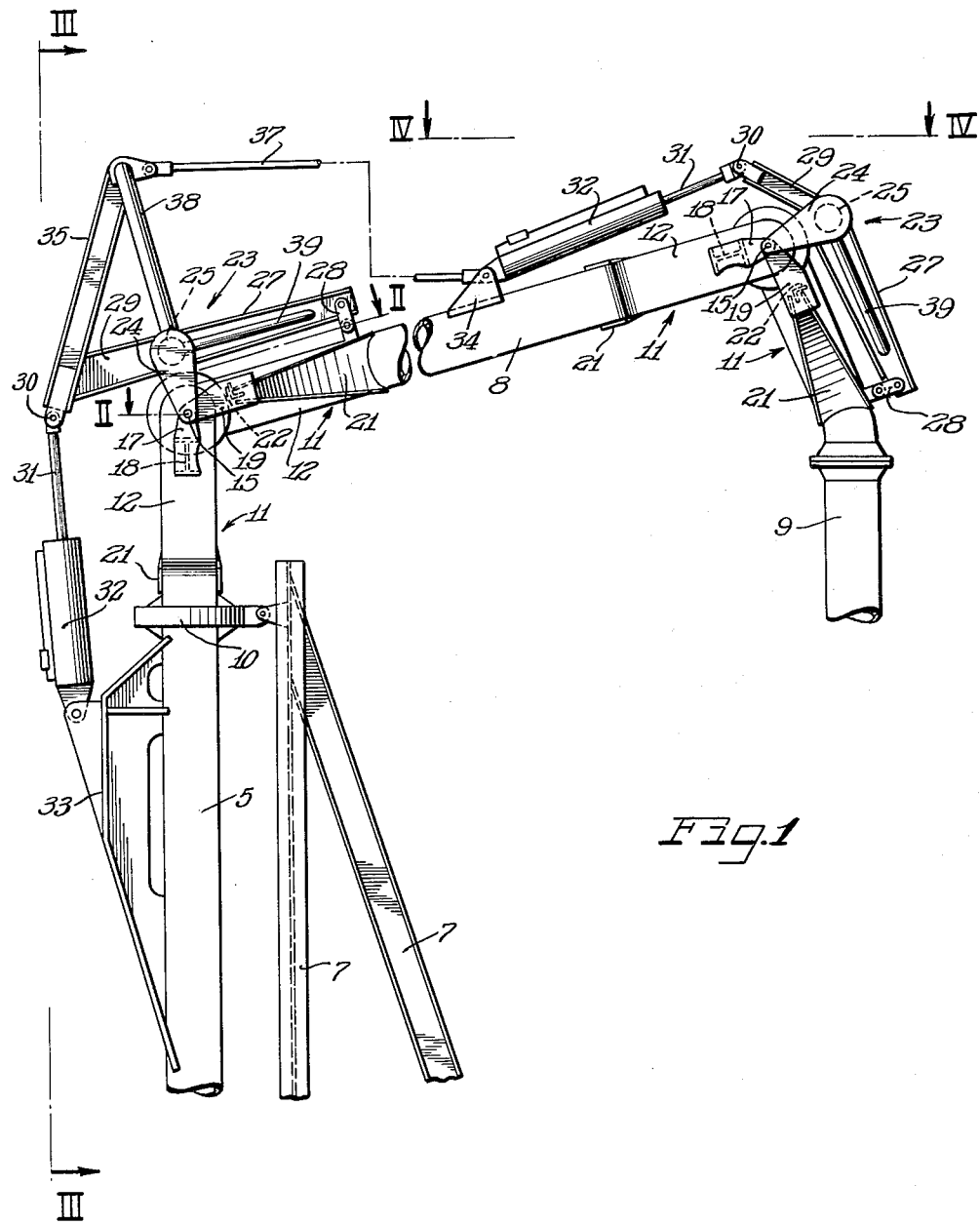
FIGURE 1 is a fragmentary side elevational view of an articulated bulk fluent material transfer conduit boom assembly embodying features of the invention.

Representative of an articulated boom assembly embodying the present invention is that depicted in FIGURE 1, constructed and arranged for transfer of bulk fluent material between a loading or unloading station and a vehicle. This type of construction is especially suitable for use in marine shipping between a loading dock or pier and a bulk cargo vessel. To this end, the structure includes a vertical riser 5 supported pivotally for swinging or swivel movement about a vertical axis by a standard 7. The riser 5 serves as a mast, carrying on its upper end a boom assembly comprising at least one boom member or section 8, but in the illustrated form comprising a plurality of boom members or sections wherein the section 8 is the inboard section supporting at its outer end an outboard boom member or section 9. Suitable connections and couplings (not shown) on the lower ends of respectively the riser 5 and the boom section 9 adapt the same for connection with manifold or tank inlets, outlets, nipples and the like.

Any preferred or suitable means may be provided for attaching the standard 7 to a supporting base such as a dock, pier, vessel deck, and the like. Support of the riser 5 by the standard 7 may be effected in any suitable fashion through desirable thrust and swivel bearing assemblies, one such swivel bearing assembly 10 being shown. Any suitable driving means (not shown) may be employed to effect swivel actuation of the riser 5.

According to the present invention, rugged, efficient, well balanced, load equalizing, bind-free and smoothly operating minimum weight and highly stress resistant means are provided for swivelly connecting the articulated sections of the boom assembly. Among other advantages is that of standardization of parts for economical production and assembly. To this end, each of the relatively swivelly connected members or sections of the assembly, including the riser 5 and the inboard boom member 8 on the one hand, and the inboard boom member 8 and the outboard boom member 9 on the other hand, is provided with a standardized swivel yoke structure 11. One of these yoke structures 11 provides the mast head on the riser 5. Each end of the inboard boom member 8 has one of the yokes 11, and the outboard boom member 9 has one of the yokes 11 on at least its inboard end for connection with the outboard end yoke 11 on the inboard boom member 8.

Each of the yokes 11 (FIGURES 1 through 4) includes as a major component a tubular gooseneck 12 which is rigid with the straight tubular part of its associated conduit section and preferably of the same pipe size. Although the gooseneck 12 may be an integral one-piece formed portion of its companion conduit section, a convenient manufacturing expedient comprises fabricating the gooseneck 12 separately and then welding it onto the integral conduit section.

A terminal portion 13 on the angular, elbow-like gooseneck 12 is disposed on a horizontal axis perpendicular to and intersecting the point of intersection of the longitudinal center axes of the straight portions of the connected conduit sections and connected by a swivel coupling 14 to the complementary, coaxially related terminal portion 13 of the gooseneck 12 of the associated conduit section. Desirably, though not necessarily, the coupling 14 lies in the vertical plane of the central longitudinal axes of the riser 5 and the inboard boom section 8, and of the inboard and outboard boom sections, in each instance.

In order to relieve the swivel coupling 14 from all damaging eccentricities or loads and to enable leakproof and smooth and free-swivelling functioning of the coupling 14 all bearing loads of the pivot joint between the pairs of yokes 11 are carried by bearing pins or bolts 15 mounted coaxially at the opposite ends of the pivot joint axis and on opposite sides of the joint on respective journal flange leaf plates 17 rigid with respective mounting brackets 18 which are fixedly secured, as by welding, to the outer sides or elbows of the goosenecks 12. Since the mounting brackets 18 are, as shown, on the elbows of the goosenecks, the brackets are necessarily spaced laterally from the pivot joint axis. Hence, the plates 17 provide respective extensions from the brackets to project across such axis to mount said bearing pins coaxially with said axis.

Mutually supportive connection of each of the pair of yokes 11 to the pivot bearing 15 of the other yoke is effected through a journal plate flange arm 19 secured to a bracket plate 20 rigidly supported on the converging ends of yoke arm frame bars 21 and 22 extending in generally triangular relation and connected at their opposite ends to respectively the base portion of the gooseneck 12 and the inside of the hook-shaped side portion of the gooseneck. Thus, in the preferred construction disclosed, the bar 22 extends parallel to the pivotal axis and the bar 21 extends diagonally relative thereto as a reinforcing brace. As a result of the relatively wide spacing of the bearing assemblies of the yoke pivot and the mutually supportive relationship of the yoke journals, an efficiently balanced, equalized loading of the bearings is attained.

Another desirable attribute of the equalized bearing arrangement of the yoke pivot joints resides in affording a desirable, well balanced fulcrum at each joint for an actuating bridle assembly 23. To this end flat flange leaf-like fulcrum arms 24 of the bridle assemblies are pivotally connected with each of the bearings 15 in generally interleaved relation to the journal arms 17 and 19 at each of the bearing assemblies. These fulcrum arms 24 are of identical lengths and are rigidly secured as by means of welding to the respective opposite end portions of a stabilizer bar 25 which extends in parallel relation to the joint axis and in spaced adjacent relation to the yoke terminals 13 and the swivel connector 14.

Mounted on the stabilizer bar 25, and desirably extending longitudinally in a common vertical plane through the axes of the straight conduit sections, is an elongated actuating bridle lever arm 27 having, in each instance, its outboard end portion secured to the inboard end portion of the associated boom section by an attachment bracket-lug-link device 28 enabling automatic relative expansion and contraction and like adjustment movements of the lever arm 27 and the boom member. An inboard extension portion 29 of the lever arm projects a suitable distance beyond the swivel coupling 14 and is connected by suitable pivotal coupling or connecting means 30 with the outer end terminal of a piston rod 31 projecting from an actuating motor comprising a hydraulic cylinder 32. This actuating motor is mounted at its opposite end pivotally on a bracket 33 rigid on the riser 5 in respect to the riser-in-board boom member bridle 23, and to a bracket 34 rigid on the boom member 8 in respect to the inboard-outboard boom member bridle 23. The hydraulic actuating motors 32 are adapted to be connected into a suitable hydraulic control system, an example of which is disclosed in Patent 2,984,985, dated February 23, 1961.

To compensate bending loads, the inboard end portion of the bridle lever arm portion 29 adjacent the riser 5 carries a rigid diagonally upward and forward pylon arm bar 35 to the upper end of which is attached a guy rod 37 which overlies the inboard boom member 8 and has its outboard end attached to the bracket 34. Rigid pylon reinforcing brace bars 38 are connected between the upper end of the pylon bar 35 and the end portions of the stabilizer bar 25. Also, reinforcing brace bars 39 are secured between the end portion of the bar 25 and the outboard end portions of the bridle lever arm 27 on each of the bridle structures 23.

By virtue of fulcruming the actuating lever arm 27 on the bearings 15 of the yoke bearing assemblies efficient actuation of the articulated boom sections and support thereof in any adjusted attitude, avoiding bending stresses and assurance that the primary stresses are in direct tension and/or compression in the articulated members and the motivating structures is attained. Because of the well balanced, equalized loading of the bearing assemblies by reason of the location thereof in respect to the yokes 11 and the efficient equalized support afforded by the yoke structures, extremely rugged, heavy duty service requirements are successfully met.

It will be understood that modifications and variations may be effected without departing from the scope of the novel concepts of the present invention.

I claim as my invention:

1. In a conduit boon construction,
a swivel yoke structure comprising a tubular gooseneck portion having a terminal adapted for connection to a swivel coupling,
said gooseneck portion having an outer elbow side and an inner hook side,
a bracket mounted on said elbow side of the gooseneck portion and having journal means on an axis aligned with said terminal portion,
rigid equalizer frame means carried by the gooseneck portion on said hook side and comprising
a rigid frame bar extending parallel to said axis and a diagonally extending rigid frame bar joining the end of said parallel bar remote from the gooseneck portion,
and journal means mounted adjacent juncture of said bars and disposed on said axis and adapted for pivotal connection with the journal means of a gooseneck-carried bracket of a like gooseneck portion.

2. In a conduit boom construction,
a swivel yoke structure comprising a tubular gooseneck portion having a terminal adapted for connection to a swivel coupling,
said gooseneck portion having an outer elbow side and an inner hook side,
a bracket mounted on said elbow side of the gooseneck portion and having journal means on an axis aligned with said terminal portion,
a rigid equalizer frame means carried by the gooseneck portion on said hook side and projecting substantially beyond said terminal portion,
rigid equalizer frame means carried by the gooseneck portion on said hook side and comprising
a rigid frame bar extending parallel to said axis and a diagonally extending rigid frame bar joining the end of said parallel bar remote from the gooseneck portion,
and journal means comprising bracket structure rigidly secured to the joined ends of said bars and having journal means disposed on said axis and adapted for pivotal connection with the journal means of a gooseneck-carried bracket of a like gooseneck portion.

3. In a conduit boom construction,
a swivel yoke structure comprising a tubular gooseneck portion having a terminal adapted for connection to a swivel coupling,
said gooseneck portion having an outer elbow side and an inner hook side,
a bracket mounted on said elbow side of the gooseneck portion spaced laterally from an axis through said terminal and including an extension comprising a journal leaf flange plate affording a journal on an axis aligned with said terminal axis,
rigid equalizer frame means carried by the gooseneck portion on said hook side and projecting substantially beyond said terminal portion,
and journal means carried by said equalizer frame means comprising a journal leaf flange plate substantially coextensive and parallel to said flange plate extension of said bracket and extending across said terminal axis so that said journal means are disposed on said axis and adapted for pivotal connection with the journal of an elbow-mounted bracket of a like gooseneck portion.

4. In an articulated pipe boom structure including a pair of pipe members adapted to be relatively adjustably pivoted,
each of said members having a swivel yoke structure comprising a tubular gooseneck portion having a terminal, a swivel coupling connecting said terminals on an axis transverse to said pipe members,
each of said gooseneck portions having an outer elbow and an inner hook,
a respective bracket mounted on each elbow spaced laterally from said axis,
an extension journal leaf flange plate on each of said brackets and extending across said axis,
a rigid equalizer frame bar structure on the hook side of each of said gooseneck portions and each including:
    a rigid frame bar extending parallel to said axis and welded in the associated hook,
    a diagonally extending rigid frame bar attached to said portion on the hook side but on the opposite side from the first mentioned bar relative to said terminals, said bars being joined together at a point beyond the elbow of the other of said gooseneck portions,
    and a journal flange plate carried by the joined ends of the bracket bars of each of the equalizer frames and lappingly engaging with the respective journal flange plates of the elbow-mounted brackets of the other of the gooseneck portions,
and means pivotally connecting the lapping journal plate flanges on said axis.

References Cited by the Examiner

UNITED STATES PATENTS

| | | | |
|---|---|---|---|
| 2,739,778 | 3/1956 | Krone et al. | 137—615 XR |
| 2,980,150 | 4/1961 | Bily | 137—615 X |
| 3,021,867 | 2/1962 | Gallagher | 137—615 X |
| 3,047,016 | 7/1962 | Andersen | 137—615 |
| 3,096,797 | 7/1963 | Bily | 137—615 X |
| 3,126,913 | 3/1964 | Green et al. | 137—615 |

FOREIGN PATENTS

| | | |
|---|---|---|
| 580,640 | 8/1959 | Canada. |
| 1,051,119 | 2/1959 | Germany. |

M. CARY NELSON, *Primary Examiner.*

LAVERNE D. GEIGER, *Examiner.*